Dec. 30, 1952   J. H. HOLSTEIN   2,623,631
SELF-LOADING DEVICE FOR SHAKER CONVEYERS
Filed Jan. 11, 1947   5 Sheets-Sheet 2
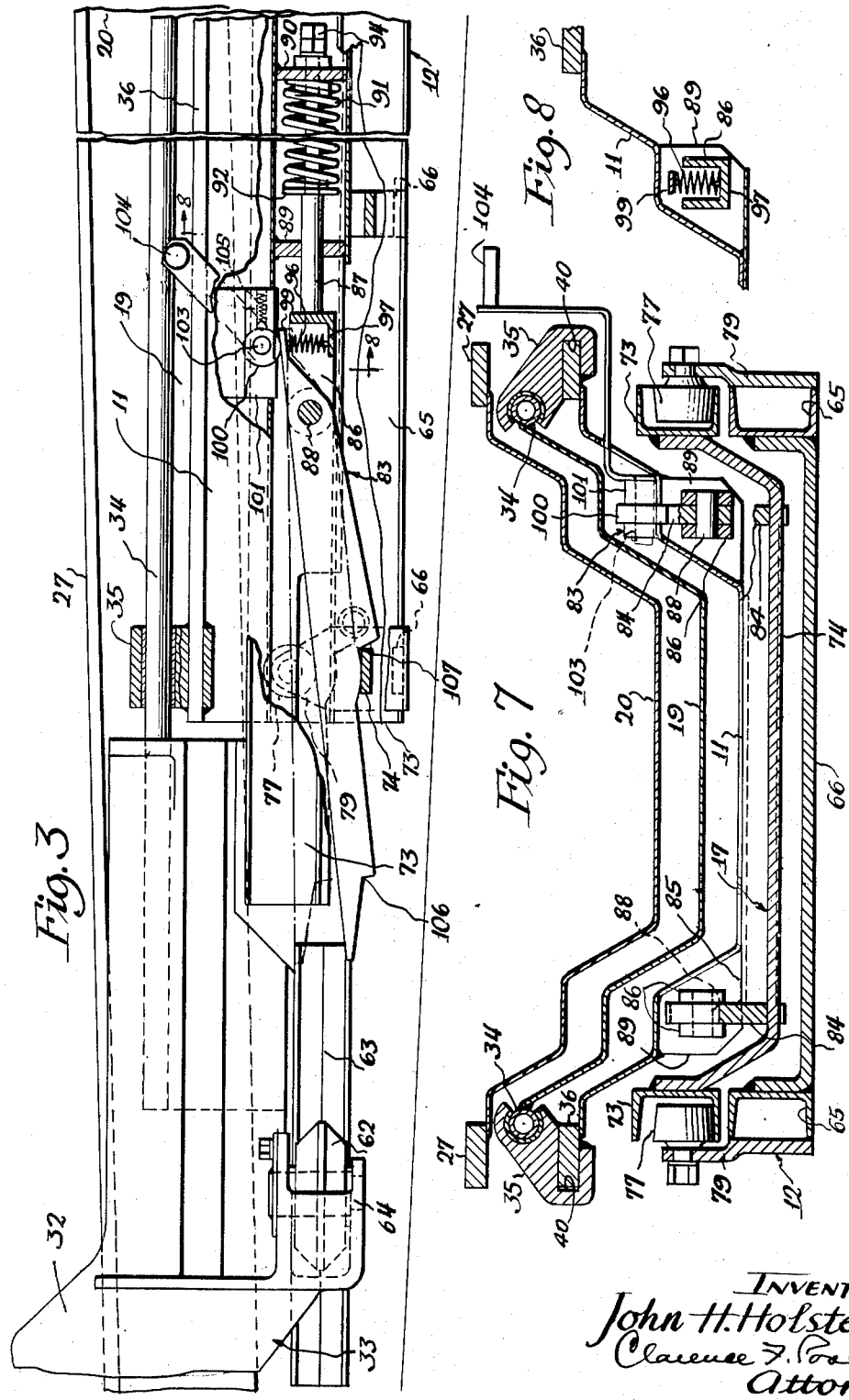
INVENTOR
John H. Holstein
Clarence F. Poole
Attorney Dec. 30, 1952 J. H. HOLSTEIN 2,623,631
SELF-LOADING DEVICE FOR SHAKER CONVEYERS
Filed Jan. 11, 1947 5 Sheets-Sheet 3
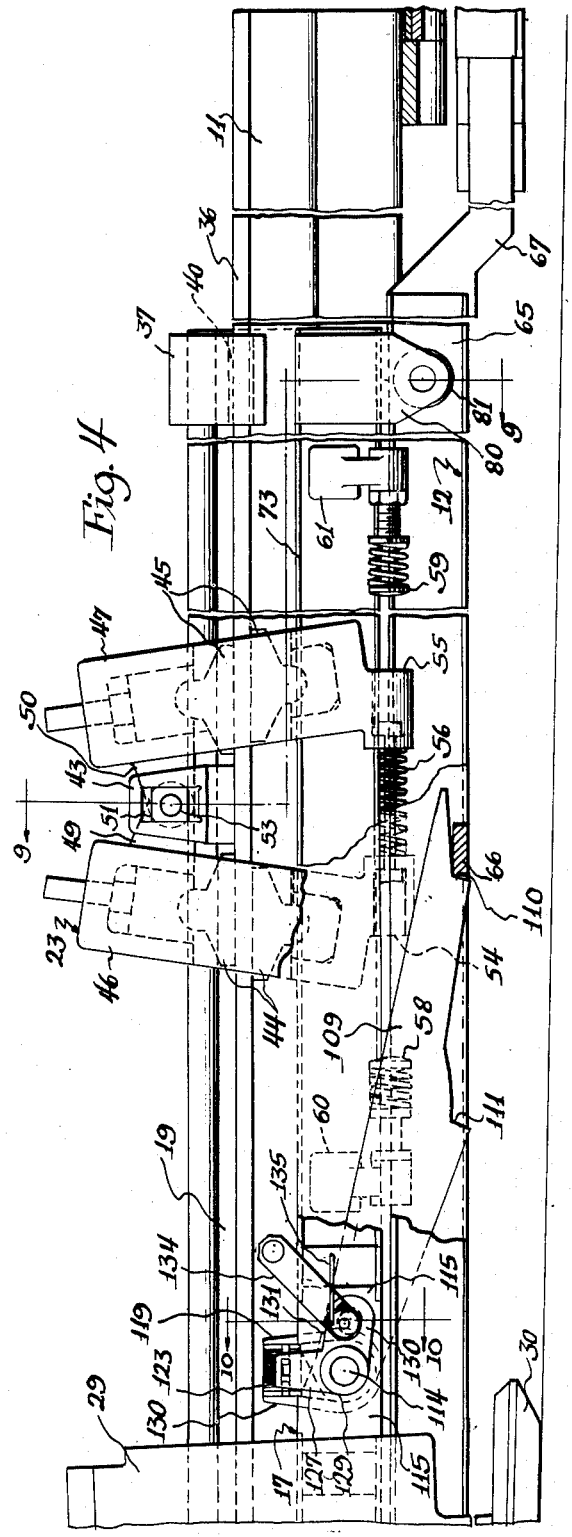
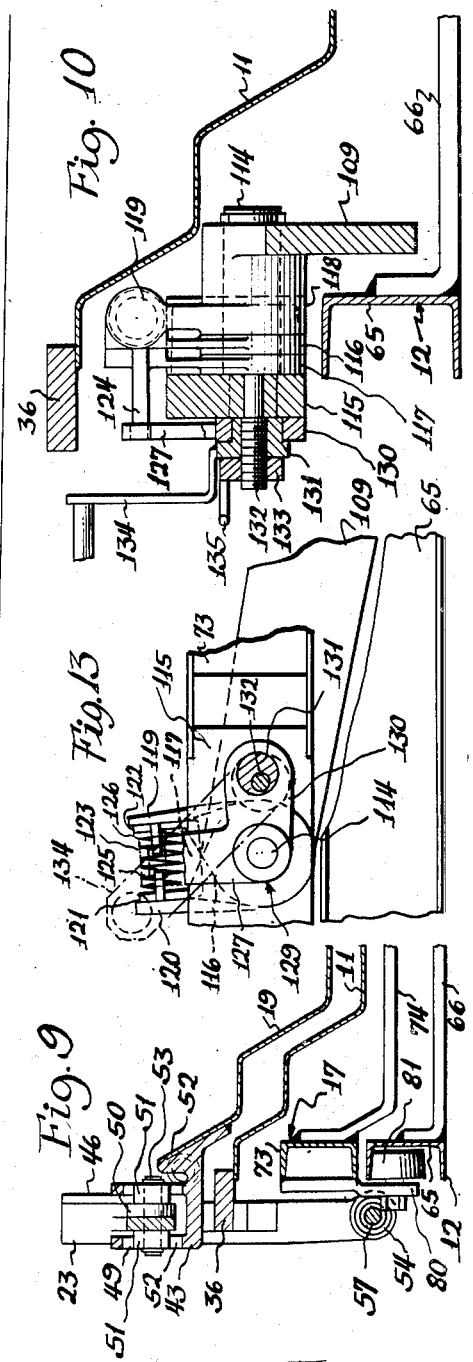
INVENTOR
John H. Holstein
Clarence F. Poole
Attorney

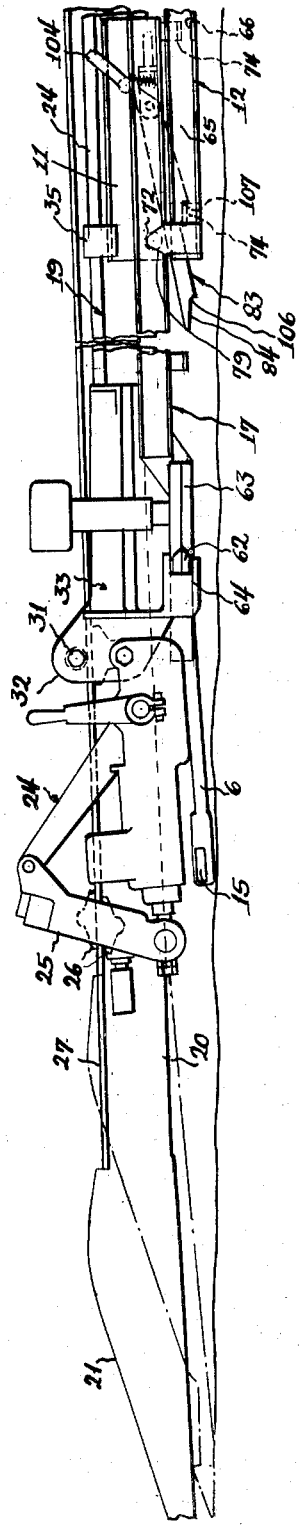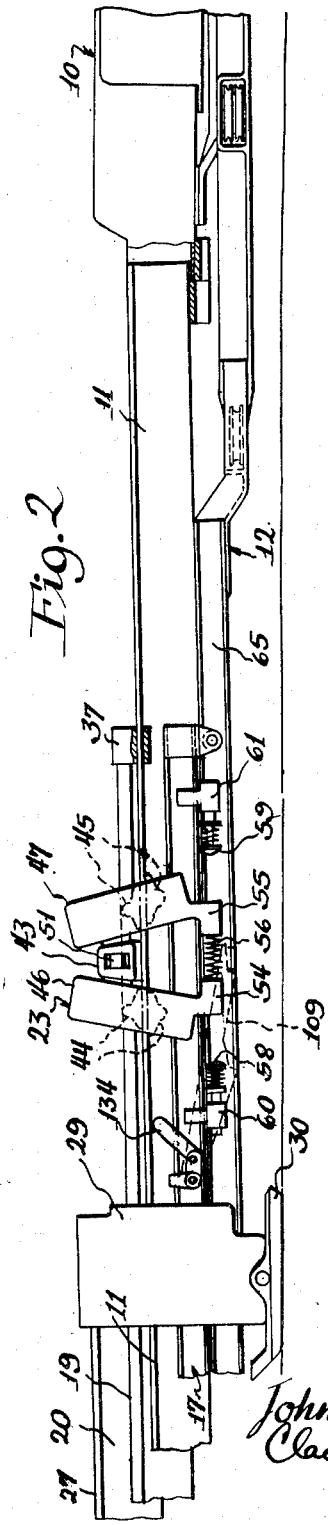

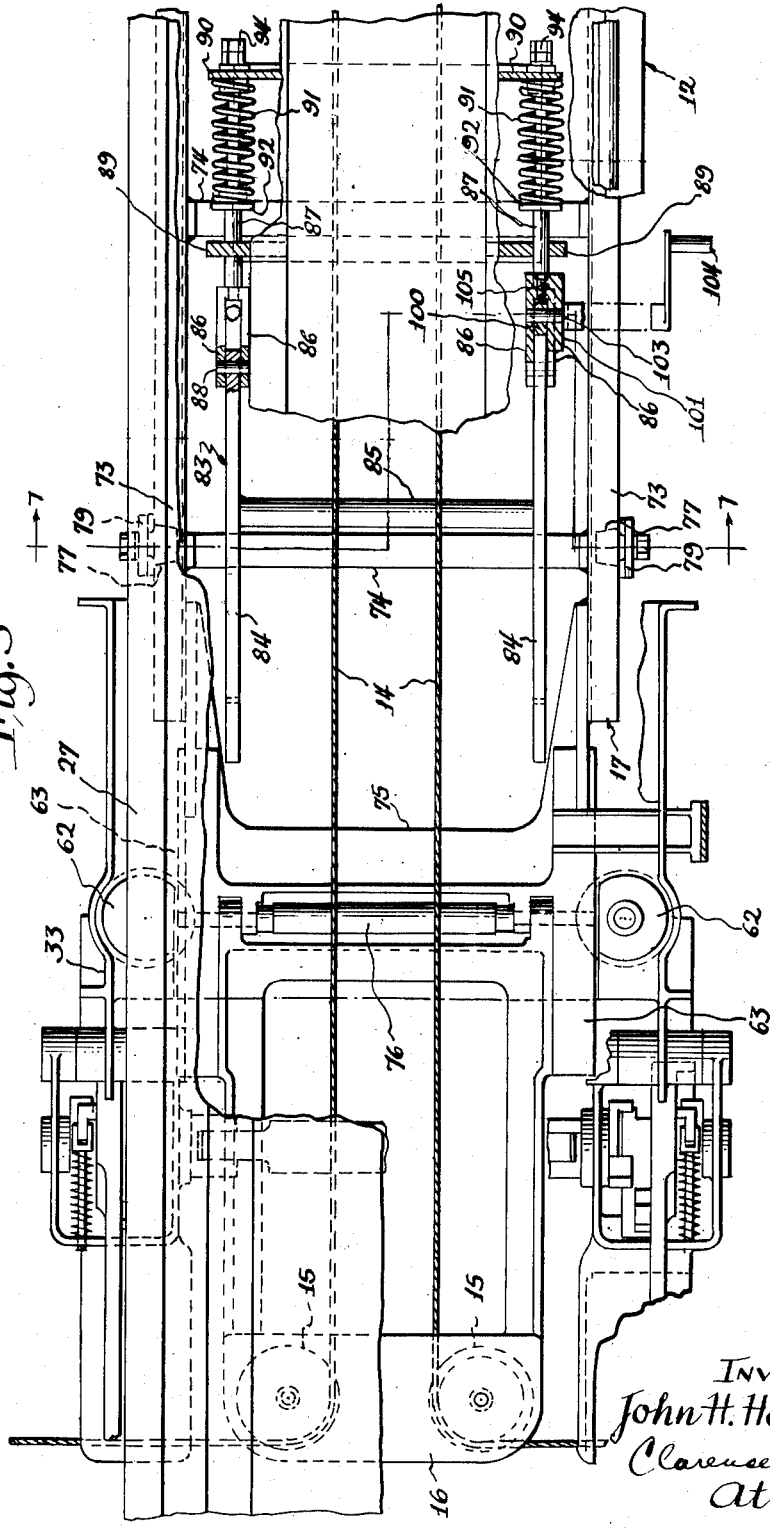

Dec. 30, 1952 J. H. HOLSTEIN 2,623,631
SELF-LOADING DEVICE FOR SHAKER CONVEYERS
Filed Jan. 11, 1947 5 Sheets-Sheet 5
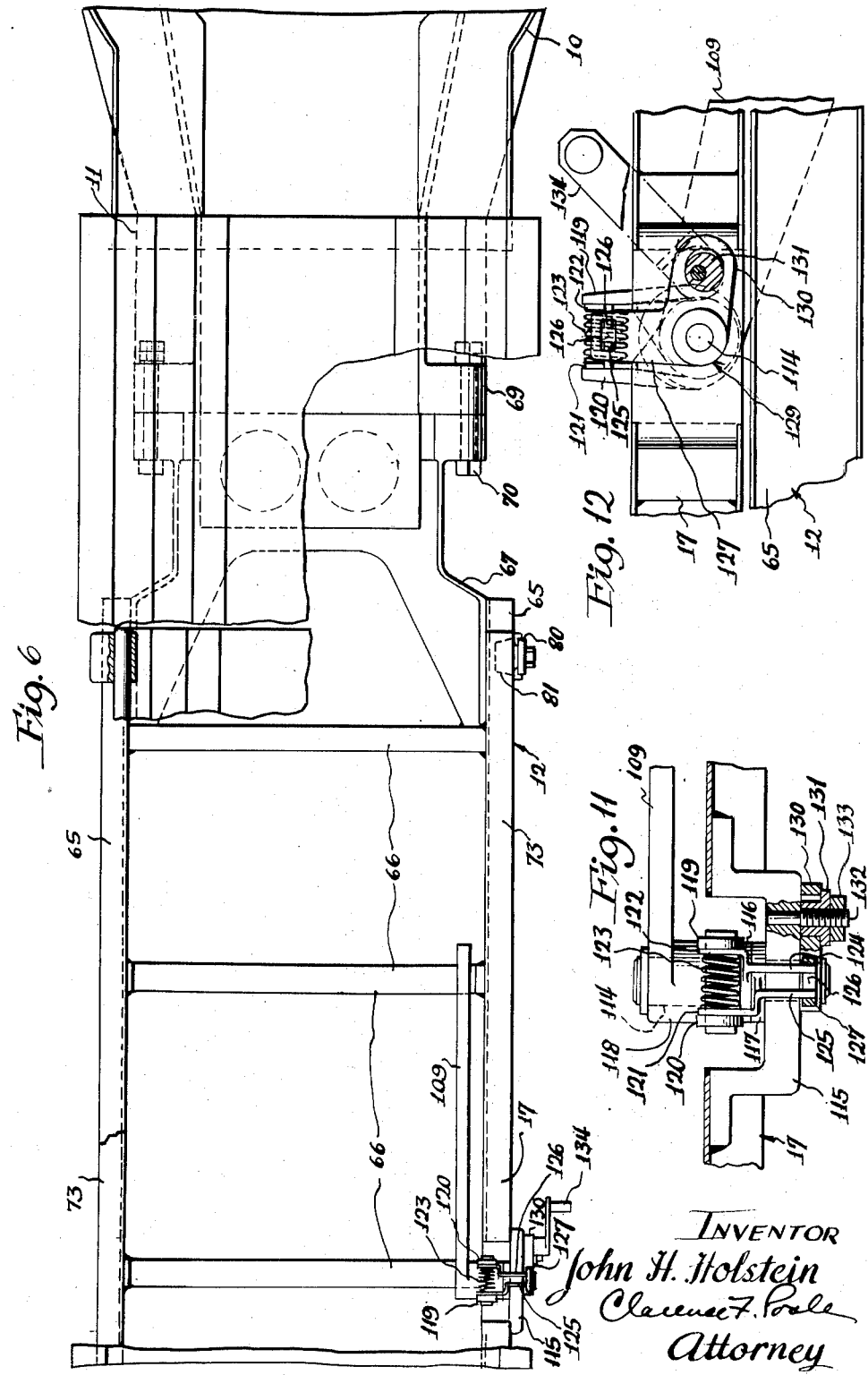
INVENTOR
John H. Holstein
Clarence F. Poole
Attorney Patented Dec. 30, 1952

2,623,631

UNITED STATES PATENT OFFICE 2,623,631

SELF-LOADING DEVICE FOR SHAKER CONVEYERS

John H. Holstein, Chicago, Ill., assignor to Goodman Manufacturing Company, Chicago, Ill., a corporation of Illinois Application January 11, 1947, Serial No. 721,649

15 Claims. (Cl. 198—220)

This invention relates to improvements in self-loading devices for shaker conveyors and more particularly relates to a self-loading device in which the pick-up member or shovel on the forward end of the extensible trough of the conveyor may be extended for a greater distance than the length of the extensible trough without inserting additional troughs in the trough line.

The principal objects of my invention are to provide a self-loading device for shaker conveyors including a non-reciprocating frame forming a guide for the reciprocating and extensible troughs of the conveyor, and so arranged as to swing the reciprocating and extensible troughs of the conveyor laterally upon lateral movement of said frame, and to extend itself when the extensible trough has been extended for the full length of its travel, so as to permit extension of said extensible trough for a greater distance than its length, without inserting additional troughs in the trough line.

In carrying out my invention I connect a reciprocating trough to the inby end of a swivel in a shaker conveyor trough line so as to permit said trough to move laterally with respect to the trough line. I also nest an intermediate trough within this reciprocating trough and mount this intermediate trough for telescopic movement with respect to the reciprocating trough, and provide a releasable drive connection between these troughs, which is arranged to reciprocably drive the intermediate trough and to permit its extension along the reciprocating trough. A feeding device operated by the action of the conveyor is mounted on the forward end of the intermediate trough to extensibly or retractibly move the extensible trough with respect to the intermediate trough. I further provide an extensible guide frame for these troughs which is connected to the swivel at its rear end, for lateral swinging movement with respect thereto, for laterally swinging said troughs about said swivel upon lateral movement of said frame, and extend this frame by the reciprocating action of the conveyor and extend the intermediate trough along the reciprocating trough, to permit extension of the extensible trough for a greater distance than its length without inserting additional troughs in the trough line.

These and other objects of my invention will appear from time to time as the following specification proceeds and with reference to the accompanying drawings wherein:

Figure 1 is a view in side elevation of the forward part of a self-loading device constructed in accordance with my invention;

Figure 2 is a continuation of Figure 1 showing the rear part of the self-loading device;

Figure 3 is an enlarged fragmentary view in side elevation of the forward part of the device shown in Figure 1, with certain parts broken away and with certain other parts shown in substantially longitudinal section;

Figure 4 is an enlarged fragmentary view in side elevation of the rear part of the device shown in Figure 1, with certain parts broken away and certain other parts shown in substantially longitudinal section;

Figure 5 is an enlarged fragmentary plan view of the forward part of the device shown in Figure 1, with certain parts broken away and with certain other parts shown in substantially horizontal section;

Figure 6 is an enlarged fragmentary plan view of the rear part of the device shown in Figure 1, with certain parts broken away and with certain other parts shown in substantially horizontal section;

Figure 7 is an enlarged fragmentary transverse sectional view taken substantially along line 7—7 of Figure 5;

Figure 8 is an enlarged fragmentary detail transverse sectional view taken substantially along line 8—8 of Figure 3;

Figure 9 is a fragmentary transverse sectional view taken substantially along line 9—9 of Figure 4;

Figure 10 is an enlarged fragmentary transverse sectional view taken substantially along line 10—10 of Figure 4;

Figure 11 is an enlarged detail plan view, with certain parts broken away and with certain other parts shown in substantially horizontal section in order to show certain details of the means for applying and releasing the holding dog for the extensible frame;

Figure 12 is an enlarged view in side elevation with certain parts shown in substantially longitudinal section in order to show certain details of the means for controlling operation of the holding dog for the extensible frame, with the control lever therefor in position to permit said dog to be in an engaged position; and Figure 13 is a view somewhat similar to Figure 12 but showing the control lever in position to release the holding dog to permit retraction of the extensible frame.

In the drawings, the device embodying my invention is shown as including a swivel trough 10 having a reciprocating trough 11 connected to the inby end thereof and reciprocably driven therefrom. Said swivel trough may be of a form somewhat similar to that shown in William W. Sloane Patent No. 2,433,961, and may be connected to the inby end of a shaker conveyor trough line (not shown) and reciprocably driven therefrom for providing the continuous flow of material from the reciprocating trough 11 to the trough line when the reciprocating trough 11 is swung to either side of the trough line about the swivel trough 10, and is not herein shown or described in detail since it is no part of my present invention.

The reciprocating trough 11 is reciprocably guided in a non-reciprocating guide frame 12 connected at its rear end to the swivel trough 10 for lateral movement thereabout, as will hereinafter more clearly appear as this specification proceeds. Flexible feeding mechanisms including a pair of flexible cables 14, 14 wound on and paid off of suitable winding drums (not shown) mounted on the base of the swivel trough 10, are trained laterally from the forward end of said swivel trough about guide sheaves 15, 15, to laterally move said frame (see Figure 5). The guide sheaves 15, 15 are mounted on a floating forward end 16 of an extensible portion 17 of the frame 12. The frame 12 forms a guide means and reaction member for the reciprocating trough 11, for an intermediate trough 19 nested in and extensible from the reciprocating trough 11, and for an extensible trough 20 extensible from the intermediate trough 19, and serves to move the troughs laterally upon lateral movement of said swivel trough, to position a pick-up member or shovel 21 on the forward end of the extensible trough 20 to pick up loose material from the remote corners at the working face of a mine.

The intermediate trough 19 is nested within and extensible from the reciprocating trough 11 and is reciprocably driven therefrom by means of friction grip driving devices 23, 23 arranged at opposite sides of the trough 19, to permit extension of the intermediate trough 19 with respect to the reciprocating trough 11 and to drive said intermediate trough 19 from said reciprocating trough 11 in all positions of extension with respect thereto. Friction grip feeding devices indicated generally by reference character 24 are mounted at the forward end of the intermediate trough 19 and extend in advance thereof, for extensibly or retractibly moving the extensible trough 20 with respect to the intermediate trough 19. The feeding devices 24 include a carrier member 25 on each side of the extensible trough 20 having friction grip blocks 26, 26 adapted to engage bearing plates 27, 27 extending along and laterally from the upper edges of the extensible trough 20, as usual. Said feeding devices may be of any well known form and are herein shown as being of a type shown and disclosed in William W. Sloane Patent No. 2,454,484, so need not herein be shown or described in detail.

The extensible trough 20 rests on the ground on the forward end of the shovel 21, and is supported above the ground at its rear end on a pair of parallel spaced legs 29, 29 secured to the bearing plates 27, 27 and depending therefrom and transversely pivoted adjacent their lower ends to a ground engaging shoe 30 (see Figure 2). The bearing plates 27, 27 besides being engaged by the grip blocks 26, 26 also form a supporting means for the forward end of the intermediate trough 19 on rollers 31, 31 which rest on bearing plates 27, 27. The rollers 31, 31 are mounted on opposite upright side walls 32, 32 of a frame 33, which is secured to and extends across the bottom of and upwardly along opposite sides of the forward end of the intermediate trough 19 beyond the upper limits thereof and in advance of the forward end thereof. The frame 33 also has the feeding devices 24 transversely pivoted thereto and extending in advance thereof, as usual.

The intermediate trough 19 has a tubular reinforcing member 34 extending along each upper outer edge thereof. The reinforcing members 34 are adapted to be slidably supported in support brackets 35, 35 secured to and extending upwardly from bearing plates 36, 36, which extend along and project laterally from the upper edges of the reciprocating trough 11 (see Figure 7). The intermediate trough 19 has support brackets 37, 37, which are secured to the reinforcing members 34, 34 adjacent the rear end thereof, and which brackets depend from the members 34, 34 and are like the brackets 35, 35 except that they are secured to the members 34, 34 instead of being slidably mounted thereon. The brackets 37, 37 have inwardly opening lower slotted portions having bearing surfaces 40, 40 provided in the upper and lower faces thereof, which slidably engage the bearing plates 36, 36.

The friction grip driving devices 23, 23 are mounted on brackets 43, 43 projecting outwardly from opposite upper sides of the intermediate trough 19. Said driving devices each include two pairs of opposed friction grip blocks 44 and 45 mounted in opposed inclined carrier members 46 and 47, respectively. The grip blocks 44, 45 are adapted to engage the upper and lower sides of the bearing plates 36, 36 for reciprocably moving the intermediate trough 19 with the reciprocating trough 11, and are arranged to provide extensible or retractible movement of the intermediate trough 19 with respect to the reciprocating trough 11, it being understood that the friction grip blocks 44, 44 move the intermediate trough 19 with the reciprocating trough 11 during the forward strokes of the conveyor, and that the other of said pairs of friction grip blocks 45, 45 move the intermediate trough 19 with the reciprocating trough 11 during the return strokes of the conveyor. Said driving devices are the same on each side of the conveyor so need herein be described for one side of the conveyor only, and are similar to those shown and described in my Patent No. 2,344,871 dated March 21, 1944, so will only herein be shown and described in sufficient detail to make my present invention readily understandable.

The carrier members 46, 47 have overlapping ears 49 and 50, respectively, which are pivotally connected to two laterally spaced aligned blocks 51, 51 at a pivotal pin 53 (see Figure 9). The blocks 51, 51 are guided in upright rectilinear guides 52, 52 formed integrally with and projecting upwardly from the bracket 43. The carrier members 46, 47 also have depending lugs 54 and 55 respectively, between which are interposed a compression spring 56, encircling a rod 57 slidably mounted in the lugs 54 and 55. The spring 56 tends to move the lower ends of said carrier members away from each other about the axis of the pivotal pin 53, and its strength is such as to hold the carrier members 46, 47 in position to cause the grip blocks 44, 44 to engage the bearing plate 36 and cause movement of the intermediate trough 19 with the reciprocating trough 11 during the forward strokes of the conveyor, and to cause the grip blocks 45, 45 to engage the bearing plate 36 and cause movement of the intermediate trough 19 with the reciprocating trough 11 during the return strokes of the conveyor, and cause movement of the intermediate trough 19 along the reciprocating trough 11 when the intermediate trough 19 engages an obstruction during either a forward or return stroke of the conveyor.

Two longitudinally spaced yieldable stops 58 and 59, mounted on the extensible portion 17 of the frame 12, are provided to engage the lugs 54, 55 and release either of the grip blocks 44, 44 or 45, 45 upon extensible or retractible movement of said frame and cause the reciprocating trough 11 to extensibly or retractibly move the intermediate trough 19 by the other set of grip blocks, which are not released. The stops 58 and 59 are mounted on brackets 60, 61, respectively, and their engaging ends face each other and are spaced apart a distance equal to substantially the stroke of the conveyor, plus the distance between the engaging ends of the lugs 54, 55, and besides serving as a releasing means for their associated grip blocks, to cause either pair of the grip blocks 44, 44 or 45, 45 to effect movement of the intermediate trough 19 with respect to the reciprocating trough 11, and also serve to maintain the intermediate trough 19 in centered relation with respect to the extensible portion 17 of the guide frame 12. This prevents the intermediate trough 19 from coming out of engagement with the frame 12 and prevents supporting and guiding rollers 62, 62 at the forward end of the intermediate trough 19 from riding beyond either end of a pair of guide tracks 63, 63.

The guide tracks 63, 63 are secured to and extend along opposite outer sides of the forward portion of the extensible portion 17 of the frame 12. The rollers 62, 62 have substantially V-shaped engaging faces which are adapted to engage recessed V-shaped faces of said guide tracks, and are mounted in brackets 64, 64, depending from opposite side walls 32, 32 of the frame 33 (see Figures 1, 3 and 5). The rollers 62, 62 serve to support and guide the forward end of the intermediate trough 19 for reciprocable movement along the extensible portion 17 of the frame 12 and serve to support the forward end of the extensible portion 17 of the frame 12 above the ground.

The fixed portion of the extensible frame 12 includes two outwardly facing parallel spaced longitudinally extending channels 65, 65 connected together by a plurality of longitudinally spaced cross bars 66, 66 as shown in Figures 6 and 7. A connecting frame 67, which may be a casting, is suitably secured to the insides of the rear portions of said channels as by welding, and extends rearwardly therefrom (see Figures 4 and 6). The frame 12 extends rearwardly and downwardly of the channels 65, 65, and abuts and is secured to a laterally swingable supporting frame 69 of the swivel trough 10 by connecting bolts 70, 70. The supporting frame 69 serves to support the rear end of the extensible frame 12 above the ground and to connect the extensible frame 12 to the swivel trough for lateral movement with respect thereto in a controlled arcuate path. The supporting frame 69 is pivotally connected to the base (not shown) of the swivel trough 10, for movement with respect thereto about a vertical axis in a manner which is not herein shown or described since it is no part of my present invention.

The extensible portion 17 of the frame 12 includes a pair of parallel spaced outwardly facing channels 73, 73 connected together by cross bars 74, 74, shown as extending downwardly of said channels to clear the bottom of the reciprocating trough 11 (see Figure 7). The forward ends of the channels 73, 73 are connected together by a frame or casting 75 secured to the inside faces thereof and extending forwardly therefrom (see Figure 5). The floating forward end 16 of the extensible frame 17 is pivotally connected thereto by a pivotal pin 76, and is adapted to be maintained in floating engagement with the ground by the pull of the cables 14, 14, so as to maintain the cables 14, 14 close to the ground as shown and described in E. R. Bergmann, Patent No. 2,425,078.

The extensible portion 17 of the frame 12 is mounted on the fixed portion thereof for reciprocable movement with respect thereto on a pair of rollers 77, 77 engaging the insides of the lower outwardly facing flanges of the channels 73, 73 and mounted on brackets 79, 79 secured to the outer sides of the channels 65, 65, adjacent the forward ends thereof and projecting upwardly therefrom (see Figure 7). Similar brackets 80, 80 are secured to the outsides of the webs of the channels 73, 73 adjacent the rear ends thereof and depend therefrom (see Figures 4 and 9). Rollers 81, 81 are rotatably mounted on and extend inwardly from said brackets 80, 80 and engage the under sides of the upper flanges of said channels 65, 65. The forward end of the extensible portion 17 of the frame 12 is thus supported above the ground by the intermediate trough 19 on the rollers 62, 62 and the extensible portion 17 of the frame 12 supports the fixed portion thereof above the ground on the rollers 77, 77 and 81, 81.

A ratchet device 83 mounted on the reciprocating trough 11, is provided to extend the extensible portion 17 of the frame 12 by the action of the conveyor. The ratchet device 83 includes two laterally spaced dogs 84, 84 extending along the insides of the channels 73, 73 and connected to operate together by means of a member 85 (see Figure 5). Each of the dogs 84 is transversely pivoted adjacent its rear end to a clevis 86 on a guide rod 87 at a pivotal pin 88. The guide rod 87 is slidably guided in the reciprocating trough 11 on longitudinally spaced guides 89 and 90, projecting outwardly from the sides of the reciprocating trough 11, beneath the top thereof (see Figures 3 and 5).

The guide rod 87 is encircled by a compression spring 91 disposed between the guides 89 and 90 and abutting the guide 90 at one of its ends and a collar 92 at its opposite end, which collar abuts a shouldered portion of the guide rod 87 as shown in Figure 3. The springs 91 encircling said guide rods 87, 87 are normally loaded to such an extent that they act as solid members and only yield when the extensible portion 17 of the frame 12 is held from advancing movement by an obstruction. Lock nuts 94, 94, threaded on each of the guide rods 87 and abutting the rear ends of the guides 90, 90, serve to hold the rods 87 to the guides 90 and serve as an adjusting means to preload the springs 91.

A separate spring 96 serves to urge each dog 84 into position to engage the cross bars 74, 74 and to yieldably restrain upward movement of said dogs (see Figures 3 and 8). Each of said springs is disposed between the arms of the clevis 86 of the guide rod 87, and is interposed between a bottom piece 97 formed in the clevis 86 and a rearwardly projecting end 99 of the dog 84. An eccentric 100 mounted in a bracket 101 on the left-hand side of the device when looking towards its forward end, is provided to move the dogs 84 out of position to engage the cross bars 74, 74. The bracket 101 is herein shown as being recessed within an outer left-hand side wall of the trough 11. The eccentric 100 is secured to a pin 103 and engages the top surface of the rearwardly projecting end 99 of the left-hand dog 84, for moving both of said dogs into an elevated position out of engagement with the cross bars 74, 74 when pressure is relieved from said dogs during a return stroke of the conveyor. A hand lever 104 suitably secured to the outer end of the pin 103 is provided to operate the eccentric 100. A detent 105 of a well known form of spring-pressed ball type is provided to index said eccentric in its various operative positions.

The cross bars 74, 74 are spaced apart distances equal to twice the lengths of the stroke of the conveyor, and the dogs 84, 84 have two longitudinally spaced engaging portions 106 and 107, spaced apart distances equal to the length of the stroke of the conveyor. Thus when the eccentric 100 is in position as shown in Figure 3, the dogs 84, 84 will engage the cross bars 74, 74, and during operation of the conveyor during the forward strokes thereof, the engaging portions 107, 107 of the dogs 84, 84 will first engage a cross bar 74 and move the extensible portion 17 of the frame 12 a distance equal to the length of the forward stroke of the conveyor. During the next forward stroke of the conveyor the engaging portions 106, 106 of the dogs 84 will engage the same cross bar and again advance the extensible portion 17 of the frame 12 a distance equal to the length of the forward stroke of the conveyor. During the third forward stroke of the conveyor the engaging portions 107, 107 will engage the next succeeding cross bar 74 and so on until the extensible portion 17 of the extensible frame 12 has been extended to the desired extent.

Means are provided to hold the extensible portion 17 of the frame 12 from backward sliding movement which includes a holding dog 109 pivotally mounted on the inner side of the left-hand channel 73 and having downwardly facing engaging portions 110 and 111 adapted to progressively engage the cross bars 66, 66 (see Figure 4). The cross bars 66, 66, like the cross bars 74, 74, are spaced apart distances equal to twice the length of the stroke of the conveyor and the engaging portions 110 and 111 of the holding dog 109 are spaced apart distances equal to the stroke of the conveyor so first one engaging portion and then the other will engage the same cross bar, to hold the frame 12 from retractible movement as it is being extended and when it is in various desired extended positions.

The holding dog 109 is pivotally mounted on a transverse shaft 114 at its inner end. The shaft 114 is secured to and extends inwardly from a support member 115 mounted on the outer side of the web of the channel 65, between the flanges thereof (see Figure 13). The member 115 is of a substantially U-shaped formation in plan, with the open portion thereof facing the web of the channel 65. The web of the channel 65 is cut away adjacent the open portion of the member 115 to receive two abutting tension members 116, 117 and to receive a boss 118 formed integrally with the holding dog 109 and extending outwardly therefrom.

The boss 118 has two spaced apart abutment surfaces 119, 120 which extend upwardly therefrom, and between which extend engaging surfaces 121, 122 of the tension members 116 and 117, respectively (see Figure 11). A longitudinally extending compression spring 123 is interposed between said engaging surfaces. The tension members 116 and 117 also have outward projections 124, 125 extending through a slot 126 at the upper end of a lever arm 127 of a bell crank 129 and are held in engagement with opposite sides of the slot 126 by means of the compression spring 123. The bell crank 129 is pivotally mounted on the outer end of the shaft 114 and has another lever arm 130, which is apertured adjacent its outer end, to receive an eccentric disk 131. Said eccentric disk is threaded on a pin 132 secured to the support member 115 and projecting outwardly therefrom. A nut 133 is provided to lock said eccentric from movement with respect to said pin, and a hand lever 134 is provided to turn said eccentric and move said bell crank from the position shown in Figure 12 to the position shown in Figure 13. A hand grip 135 extends outwardly from the lock nut and is provided to turn said nut 133 to a locked or a released position.

When the hand lever 134 is in the position shown in Figure 12, the upright lever arm 127 of the bell crank 129 will be moved to the right. This will move the engaging surface 121 of the tension member 116 to the right and will cause the spring 123 to exert a force in a direction to yieldably hold the holding dog 109 in position to engage the cross bars 66, 66, as the extensible portion 17 of the frame 12 advances along the channels 65, 65, and hold the extensible portion 17 of the frame 12 from retractible movement.

When the hand lever 134 is in the position shown in Figure 13, the upright lever arm 127 of the bell crank 129 will be moved to the left. This will move the engaging surface 122 of the tension member 117 to the left and cause the spring 123 to exert a force in the same direction. When the hand lever 134 is in this forwardly inclined position, the spring 123 will lift the holding dog 109 by means of the bell crank 129 out of position to engage the cross bars 66, 66 upon a forward stroke of the conveyor, when pressure is relieved from the engaging portion 110 of the holding dog 109.

The loading operation is started with the frame 12 and extensible trough 20 and intermediate troughs 19 in retracted relation with respect to each other. The extensible trough 20 may then be extended by the feeding device 24 while being moved from side to side by the cables 14, 14 until one working place has been loaded out. During the operation of loading the next working place the extensible trough 20 may again be extended. At the end of this second loading operation, the extensible trough 20 is usually extended for its full length. After the second loading operation the extensible trough 20 may then be fully retracted by the operation of the conveyor. The hand lever 104 may then be moved to a rearward position, whereby the dogs 84, 84 will engage the cross bars 74, 74 during the forward strokes of the conveyor, to extend the extensible frame 12 by the action of the conveyor. At the same time the hand lever 134 may be moved to the rearward position shown in Figure 12 whereby the holding dog 109 will progressively engage the cross bars 66, 66 of the stationary part of the extensible frame 12, during extension of said frame, to hold said frame from retractible movement.

During extension of the frame 12, the stops 59, 59 will be moved into engagement with the lugs 55, 55 of the carrier member 47. This will release the grip blocks 45, 45 from the bearing plates 36 during the forward strokes of the conveyor, to extend the intermediate trough 19 by the action of the conveyor.

When the frame 12 has been extended to the desired extent, the hand lever 104 is rocked to a forward position during a return stroke of the conveyor to disengage the dogs 84, and 84 from the cross bars 74, 74. The hand lever 134 is left in a rearward position whereby the holding dog 109 will hold the frame 12 in an extended position. The troughs 11 and 19 reciprocably moving back and forth will be centered with respect to the frame 12 and stops 58, 58 and 59, 59 by engagement of the lugs 55, 55 with the stops 59, 59 during the return strokes of the conveyor. This will disengage the grip blocks 45, 45 from the bearing plates 36, 36 and will cause the grip blocks 44, 44 to engage the bearing plates 36 to advance the intermediate trough 19 until the stops 59, 59 no longer engage the lugs 55, 55, at which time the lugs 54, 54 and 55, 55 will be centered between the stops 58, 58 and 59, 59, and the intermediate trough 19 will be centered with respect to the extensible frame 12.

When it is desired to retractibly move the extensible frame, the hand lever 104 is moved into a forward position, to raise the dogs 84, 84 out of engagement with the cross bars 74, 74. The hand lever 134 is also moved into the forward position shown in Figure 12, to compress the spring 123 to rock the holding dog 109 out of engagement with the cross bar 66 during a forward stroke of the conveyor, when pressure is relieved from the holding dog 109. The cables 14, 14 are then trained rearwardly around the sheaves 15, 15 and are attached at their free ends to a stationary part of the frame 12. Power is then applied to the winding drums for said cables, to wind in said cables and retractibly move the extensible frame 12.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a self-loading device for shaker conveyors having reciprocating trough sections, an extensible trough having a pick-up member at its forward end, for picking up loose material from the ground, a reciprocating trough, a non-reciprocating frame extending along opposite sides of said extensible and reciprocating troughs and forming a guide means therefor, said frame including two frame portions one of which is extensible with respect to the other, and means mounted on said reciprocating trough and selectively operable to engage said extensible portion of said frame during the forward strokes of the conveyor, to positively extend said frame by the reciprocating action of the conveyor.

2. In a self-loading device for shaker conveyors having reciprocating trough sections, an extensible trough having a pick-up member at its forward end, for picking up loose material from the ground, a reciprocating trough, a non-reciprocating frame extending along opposite sides of said extensible and reciprocating troughs, said frame including a fixed frame portion and an extensible frame portion movable with respect to said fixed frame portion, and ratchet means mounted on said reciprocating trough and selectively operable to engage said extensible portion of said frame during the forward strokes of the conveyor, to positively extend said frame by the reciprocating action of the conveyor, and other ratchet means mounted on the extensible portion of said frame and selectively operable to engage the fixed portion of said frame for holding said frame in its various desired extended positions.

3. In a self-loading device for shaker conveyors and in combination with an extensible trough having a pick-up member at its forward end, for picking up loose material from the ground, a reciprocating trough, a non-reciprocating frame extending along opposite sides of said extensible and reciprocating troughs and forming a guide means therefor and also forming a reaction member for said troughs for moving said troughs laterally, upon lateral movement of said frame, said frame including two frame portions one of which is extensible with respect to the other, a plurality of transversely extending parallel spaced bars spaced along said extensible portion of said frame, and ratchet means mounted on said reciprocating trough and including a dog operable to progressively engage said bars upon the forward stroke of the conveyor, to positively extend said extensible portion of said frame, and other ratchet means including a holding dog pivotally mounted on one portion of said frame and selectively operable to engage said other portion of said frame, to hold said frame in its various desired extended positions.

4. In a self-loading device for shaker conveyors, and in combination with a swivel trough on the end of a shaker conveyor trough line and reciprocably driven therefrom, a reciprocating trough connected to the end of said swivel trough for lateral movement with respect to the trough line and reciprocably driven from said swivel trough, an intermediate trough connected to said reciprocating trough for extensible movement with respect thereto, means for reciprocably driving said intermediate trough from said reciprocating trough and for extensibly or retractibly moving said swivel trough with respect to said reciprocating trough, an extensible trough mounted for extensible or retractible movement with respect to said intermediate trough, a non-reciprocating frame extending along said troughs and forming a guide means therefor and also forming a reaction member for said troughs, for moving said troughs laterally upon lateral movement of said frame about said swivel trough, said frame including a non-extensible portion connected at its rear end for lateral movement with said swivel trough, and an extensible portion mounted for extensible or retractible movement with respect to said non-extensible portion of said frame, and means operable by reciprocable movement of the conveyor for extending said frame, and to cause extension of said intermediate trough along said reciprocating trough and to provide for extension of said extensible trough for a greater distance than its length without inserting additional troughs in the trough line.

5. In a self-loading device for shaker conveyors, and in combination with a swivel trough on the end of a shaker conveyor trough line and reciprocably driven therefrom, a reciprocating trough connected to the end of said swivel trough for lateral movement with respect to the trough line and reciprocably driven from said swivel trough, an intermediate trough connected to said reciprocating trough for extensible movement with respect thereto, means for reciprocably driving said intermediate trough from said reciprocating trough and for extending or retracting said intermediate trough with respect to said reciproacting trough, an extensible trough mounted for extensible or retractible movement with respect to said intermediate trough, a non-reciprocating frame extending along said troughs and forming a guide means therefor and also forming a reaction member for said troughs, for moving said troughs laterally upon lateral movement of said frame about the axis of said swivel trough, said frame including a non-extensible portion connected at its rear end for lateral movement with said swivel trough, and an extensible portion mounted for extensible or retractible movement with respect to said non-extensible portion of said frame, and means operable by reciprocable movement of the conveyor for extending said extensible portion of said frame, and to cause extension of said intermediate trough along said reciprocating trough and provide for extension of said extensible trough for a greater distance than its length, including ratchet means mounted on said reciprocating trough and selectively operable to engage said extensible portion of said frame during the forward strokes of the conveyor.

6. In a self-loading device for shaker conveyors, and in combination with a swivel trough on the end of a shaker conveyor trough line and reciprocably driven therefrom, a reciprocating trough connected to the end of said swivel trough for lateral movement with respect to the trough line and reciprocably driven from said swivel trough, an intermediate trough connected to said reciprocating trough for extensible movement with respect thereto, means for reciprocably driving said intermediate trough from said reciprocating trough and for extending or retracting said intermediate trough with respect to said reciprocating trough, an extensible trough mounted for extensible or retractible movement with respect to said intermediate trough, a non-reciprocating frame extending along said troughs and forming a guide means therefor and also forming a reaction member for said troughs, for moving said troughs laterally upon lateral movement of said frame about the axis of said swivel trough, said frame including a non-extensible portion connected at its rear end for lateral movement with said swivel trough, and an extensible portion mounted for extensible or retractible movement with respect to said non-extensible portion of said frame, and means operable by reciprocable movement of the conveyor for extending said extensible frame portion, and to cause extension of said intermediate trough along said reciprocating trough and provide for extension of said extensible trough for a greater distance than its length, including a dog pivotally mounted on said reciprocating trough, and means selectively operable to cause said dog to engage said extensible portion of said frame during the forward strokes of the conveyor.

7. An extensible guide means for the reciprocating and extensible troughs of a shaker conveyor, for guiding said troughs in a rectilinear path and for moving said troughs about a pivot point during reciprocation thereof and providing for extension of said extensible trough beyond its length including a non-reciprocating frame having a fixed portion mounted at its rear end for movement about a vertical pivot point and having an extensible portion mounted for extensible and retractible movement with respect to said fixed portion, and means driven by the conveyor in its reciprocating movement for extending said frame including a ratchet device selectively operable to engage said extensible portion of said frame during the forward strokes of the conveyor.

8. An extensible guide means for the reciprocating and extensible troughs of a shaker conveyor, for guiding said troughs in a rectilinear path and for moving said troughs about a pivot point during reciprocation thereof and providing for extension of said extensible trough beyond its length including a non-reciprocating frame having a fixed portion mounted at its rear end for movement about a fixed vertical pivot, and having an extensible portion mounted for extensible and retractible movement with respect to said fixed portion, and a ratchet device driven by the conveyor in its reciprocating movement to extend said frame including a dog reciprocably movable with the conveyor, means for controlling operation of said dog and movable into position to disengage said dog from said extensible portion of said frame or to cause said dog to engage said extensible portion of said frame during the forward strokes of the conveyor.

9. An extensible guide means for the reciprocating and extensible troughs of a shaker conveyor, for guiding said troughs in a rectilinear path and for moving said troughs about a pivot point during reciprocation thereof and providing for extension of said extensible trough beyond its length including a non-reciprocating frame having a fixed portion mounted at its rear end for movement about a vertical pivot point, and having an extensible portion mounted for extensible and retractible movement with respect to said fixed portion, a ratchet device driven by the conveyor in its movement for extending the extensible portion of said frame including a dog reciprocably movable with the conveyor, means for controlling operation of said dog and movable into position to disengage said dog from said extensible portion of said frame or to cause said dog to engage said extensible portion of said frame during the forward strokes of the conveyor, and another ratchet device including a holding dog pivotally mounted on said extensible portion of said frame and selectively operable to engage said fixed portion of said frame, to hold said frame in its various desired extended positions.

10. An extensible guide means for the reciprocating and extensible troughs of a shaker conveyor, for guiding said troughs in a rectilinear path and for moving said troughs about a pivot point during reciprocation thereof and providing for extension of said extensible trough beyond its length including a non-reciprocating frame having a fixed portion mounted at its rear end for movement about a vertical pivot point, and having an extensible portion mounted for extensible and retractible movement with respect to said fixed portion, a ratchet device driven by the conveyor in its movement for extending said frame including a plurality of transversely extending parallel bars spaced along said extensible portion of said frame, a dog reciprocably movable with the conveyor, means selectively operable to cause said dog to progressively engage said bars upon the forward strokes of the conveyor, to positively extend said extensible portion of said frame, and to move said dog into a disengaged position with respect to said bars, and another ratchet device for holding said frame in its various desired extended positions.

11. In a self-loading device for shaker conveyors including a reciprocating trough section, an extensible trough, a non-reciprocating frame extending along said extensible trough, said frame including an extensible frame portion and having an intermediate trough section mounted thereon and extensible with respect thereto and in material-receiving relation with respect to said extensible trough, means connected with said reciprocating trough section for engagement with said extensible frame portion for extending the latter responsive to reciprocation of said reciprocating trough section, and means for extending the intermediate trough section responsive to extension of said extensible frame portion.

12. In a self-loading device for shaker conveyors including a reciprocating trough section, an extensible trough, a non-reciprocating frame extending along said extensible trough and forming a guide means therefor, said frame including an extensible frame portion and having an intermediate trough section mounted therein and extensible with respect thereto and in material-receiving relation with respect to said extensible trough, ratchet means connected with said reciprocating trough section for movement therewith and for engagement with said extensible frame portion during alternate strokes of the conveyor to extend the latter responsive to reciprocation of said reciprocating trough section, and means for extending the intermediate trough section responsive to extending movement of the extensible frame portion.

13. In a self-loading device for shaker conveyors including a reciprocating trough section, an extensible trough having a pick-up member at its forward end, a non-reciprocating frame extending along opposite sides of said extensible trough and forming a guide means therefor, said frame also including an extensible frame portion and having an intermediate trough section mounted therein and extensible with respect thereto and in material receiving relation with respect to said extensible trough, to provide for extension of said extensible trough for a greater distance than its length, and ratchet means mounted on said reciprocating trough section for engagement with said extensible frame portion and operable by reciprocating movement of the conveyor for extending said extensible frame portion, including a plurality of parallel spaced bars extending transversely of said extensible frame portion and secured to a portion thereof, and a dog mounted on said reciprocating trough section for engagement with said parallel spaced bars and reciprocably movable with the conveyor, and means selectively operable to move said dog into position to engage said bars during alternate strokes of the conveyor.

14. In a self-loading device for shaker conveyors including a reciprocating trough section, an extensible trough having a pick-up member at its forward end, a non-reciprocating frame extending along opposite sides of said extensible trough and forming a guide means therefor, said frame also having an extensible frame portion carried by a non-extensible portion thereof and having an intermediate trough section mounted therein and extensible with respect thereto and in material-receiving relation with respect to said extensible trough, to provide for extension of said extensible trough for a greater distance than its length, and ratchet means cooperating with said reciprocating trough sections, for extending said extensible frame portion, including a plurality of parallel spaced bars extending transversely of said extensible frame portion and secured to a portion thereof, a dog mounted on said reciprocating trough section for engagement with said parallel spaced bars and reciprocably movable with the conveyor, and means operable to selectively position said dog to engage said bars during alternate strokes of the conveyor, and a holding dog mounted on said extensible frame portion for engagement with said non-extensible portion to hold said extensible frame portion in its several desired extended positions.

15. In a self-loading device for shaker conveyors including a reciprocating trough section, an extensible trough having a pick-up member at its forward end, a non-reciprocating frame extending along opposite sides of said extensible trough and forming a guide means therefor, said frame also having an extensible frame portion and having an intermediate trough section mounted therein and extensible with respect thereto and in material receiving relation with respect to said extensible trough, to provide for extension of said extensible trough for a greater distance than its length, and ratchet means cooperating with said trough sections for extending said extensible frame portion, including a plurality of parallel spaced bars extending transversely of said extensible frame portion and secured to a portion thereof, a dog pivotally mounted on said reciprocating trough section and reciprocably movable with the conveyor, and means selectively operable to pivot said dog into position to engage said bars during alternate strokes of the conveyor, a plurality of parallel spaced bars secured to a non-extensible portion of said frame and spaced therealong, and a holding dog secured to said extensible frame portion and adapted to engage said second mentioned bars on said non-extensible portion of said frame, to hold said extensible frame portion in its several desired positions of extension.

JOHN H. HOLSTEIN.

REFERENCES CITED

The following references are of record in the file of this patent:

UNITED STATES PATENTS

| Number | Name | Date |
| --- | --- | --- |
| 2,165,583 | Sloane | July 11, 1939 |
| 2,280,043 | Hagenbook | Apr. 14, 1942 |